United States Patent
Zha et al.

(10) Patent No.: US 10,407,526 B2
(45) Date of Patent: *Sep. 10, 2019

(54) CROSSLINKED POLYMER COMPOSITIONS WITH TWO CROSSLINKERS FOR USE IN SUBTERRANEAN FORMATION OPERATIONS

(71) Applicant: Halliburton Energy Services, Inc., Houston, TX (US)

(72) Inventors: Weibin Zha, The Woodlands, TX (US); Hui Zhou, The Woodlands, TX (US); Kay Ann Galindo, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/545,629

(22) PCT Filed: Feb. 23, 2015

(86) PCT No.: PCT/US2015/017094
§ 371 (c)(1),
(2) Date: Jul. 21, 2017

(87) PCT Pub. No.: WO2016/137433
PCT Pub. Date: Sep. 1, 2016

(65) Prior Publication Data
US 2018/0002470 A1 Jan. 4, 2018

(51) Int. Cl.
C08F 220/56 (2006.01)
C09K 8/035 (2006.01)
C08F 222/10 (2006.01)
C08F 22/10 (2006.01)

(52) U.S. Cl.
CPC ............ *C08F 220/56* (2013.01); *C08F 22/10* (2013.01); *C08F 222/10* (2013.01); *C09K 8/035* (2013.01)

(58) Field of Classification Search
CPC .. C08F 228/02; C08F 2810/20; C08F 220/56; C08F 226/10
See application file for complete search history.

(56) References Cited

U.S. PATENT DOCUMENTS

| | | | |
|---|---|---|---|
| 4,678,591 | A | 7/1987 | Giddings et al. |
| 5,547,022 | A | 8/1996 | Juprasert et al. |
| 5,620,947 | A | 4/1997 | Elward-Berry |
| 5,695,813 | A | 12/1997 | Anchor et al. |
| 5,789,349 | A | 8/1998 | Patel |
| 6,355,752 | B1 | 3/2002 | Brungs et al. |
| 6,437,068 | B2 | 8/2002 | Loffler et al. |
| 6,465,397 | B1 | 10/2002 | Patterson |
| 6,590,050 | B1 | 7/2003 | Bair et al. |
| 6,683,144 | B2 | 1/2004 | Loffler et al. |
| 6,696,517 | B2 | 2/2004 | Loffler et al. |
| 6,891,009 | B2 | 5/2005 | Loffler et al. |
| 7,098,171 | B2 | 8/2006 | Thaemlitz |
| 7,150,322 | B2 | 12/2006 | Szymanski et al. |
| 7,208,556 | B2 | 4/2007 | Loffler et al. |
| 7,448,450 | B2 | 11/2008 | Luke et al. |
| 8,148,304 | B2 | 4/2012 | Spindler et al. |
| 2003/0153705 | A1 | 8/2003 | Malawer et al. |
| 2003/0232028 | A1* | 12/2003 | Loffler .................. A61K 8/04 424/70.16 |
| 2005/0080176 | A1 | 4/2005 | Robb |
| 2005/0239664 | A1 | 10/2005 | Patel et al. |
| 2006/0052559 | A1* | 3/2006 | Gomez .................. C08F 12/30 526/264 |
| 2006/0199117 | A1 | 9/2006 | Izumi |
| 2007/0179064 | A1 | 8/2007 | Jarrett et al. |
| 2007/0179078 | A1 | 8/2007 | Collin et al. |
| 2008/0135247 | A1 | 6/2008 | Hutchins |
| 2008/0223596 | A1 | 9/2008 | Ezell et al. |
| 2008/0264867 | A1* | 10/2008 | Mika .................. B01J 20/28033 210/679 |

(Continued)

FOREIGN PATENT DOCUMENTS

| | | |
|---|---|---|
| WO | WO-1991/003938 A1 | 4/1991 |
| WO | WO-2010/126925 A2 | 11/2010 |
| WO | WO-2010/133573 A2 | 11/2010 |
| WO | WO-2015/133986 A1 | 9/2015 |
| WO | WO-2016/137429 A1 | 9/2016 |
| WO | WO-2016/137430 A1 | 9/2016 |
| WO | WO-2016/137433 A1 | 9/2016 |
| WO | WO-2016/137434 A1 | 9/2016 |

OTHER PUBLICATIONS

International Search Report and Written Opinion from PCT/US2015/017094, dated Sep. 21, 2015, 10 pages.

*Primary Examiner* — Robert C Boyle
(74) *Attorney, Agent, or Firm* — Tenley Krueger; C. Turney Law Group PLLC

(57) ABSTRACT

A crosslinked polymer comprising reactants of a first repeating unit, a second repeating unit, a first crosslinker, and a second crosslinker that react to form the crosslinked polymer, wherein the first repeating unit is a sulfonic acid-containing monomer present from 50% to 99% by weight of the reactants, wherein the second repeating unit is selected from the group consisting of an N-vinyl amide-containing monomer, a terminal double bond-containing monomer, and any combination thereof, and is present from 1% to 50% by weight of the reactants, wherein the first crosslinker comprises at least two olefinic bonds, wherein the second crosslinker comprises at least two olefinic bonds, and wherein the first and second crosslinkers combined are present in the range of about 0.01% to about 25% by weight of the reactants.

15 Claims, 1 Drawing Sheet

(56) References Cited

U.S. PATENT DOCUMENTS

| | | | |
|---|---|---|---|
| 2010/0278763 A1* | 11/2010 | Loeffler | A61K 8/8158 424/59 |
| 2011/0168393 A1 | 7/2011 | Ezell et al. | |
| 2011/0180256 A1 | 7/2011 | Tehrani et al. | |
| 2011/0237468 A1* | 9/2011 | Reichenbach-Klinke | C09K 8/5083 507/226 |
| 2012/0077717 A1 | 3/2012 | Musa et al. | |
| 2012/0077718 A1 | 3/2012 | Yang et al. | |
| 2012/0314185 A1 | 12/2012 | Bauman et al. | |
| 2013/0056215 A1 | 3/2013 | Crews | |
| 2013/0129658 A1 | 5/2013 | Nguyen-Kim et al. | |
| 2013/0164242 A1 | 6/2013 | Tamareselvy et al. | |
| 2014/0155352 A1 | 6/2014 | Dublanchet et al. | |
| 2014/0256602 A1 | 9/2014 | Ravi et al. | |
| 2015/0000985 A1 | 1/2015 | Zhou et al. | |
| 2015/0005206 A1 | 1/2015 | Zhou et al. | |

* cited by examiner

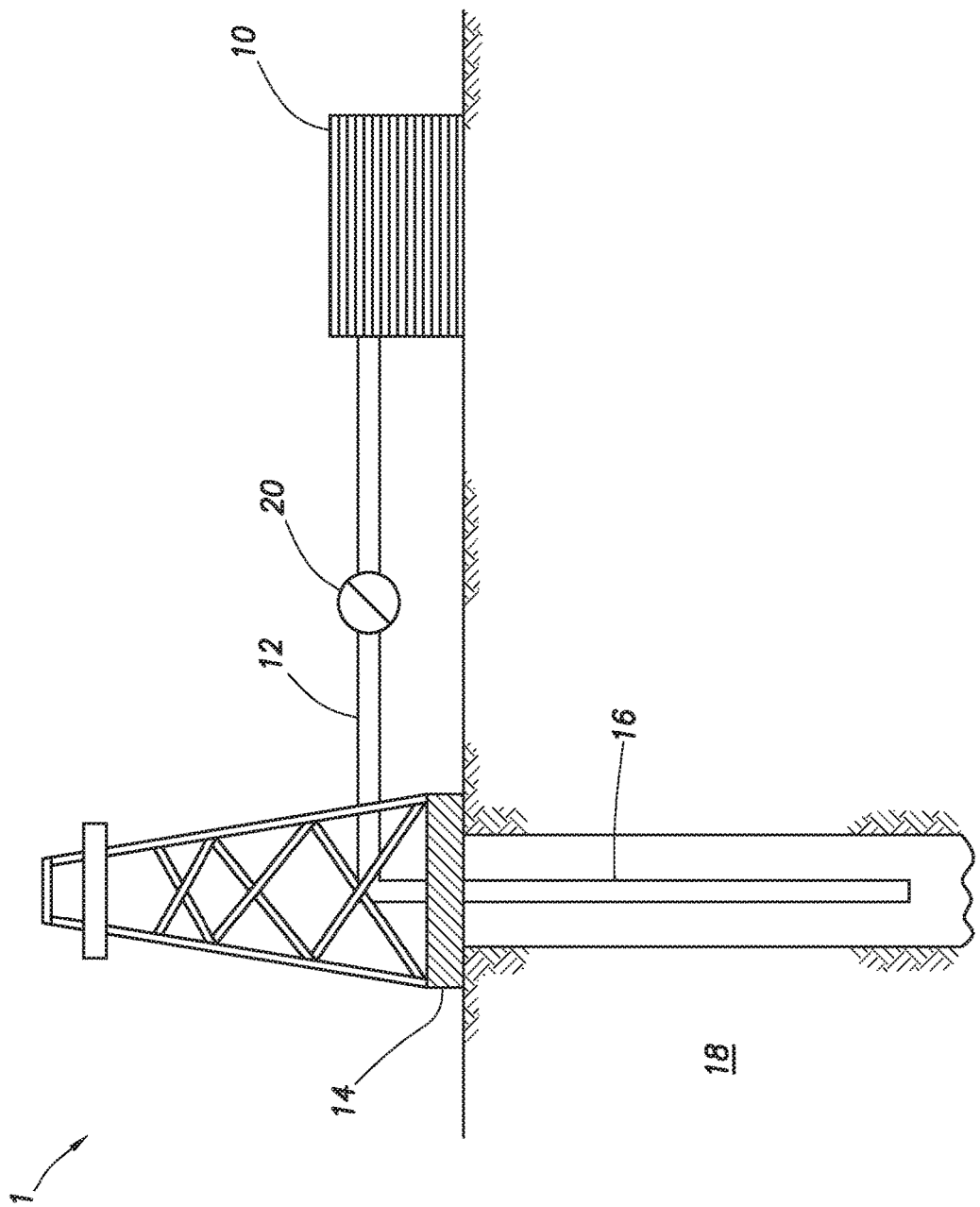

CROSSLINKED POLYMER COMPOSITIONS WITH TWO CROSSLINKERS FOR USE IN SUBTERRANEAN FORMATION OPERATIONS

BACKGROUND

The present disclosure generally relates to subterranean formation operations, and more particularly to compositions and methods for performing subterranean formation operations using crosslinked polymers.

Subterranean formation treatment fluids (also referred to herein as "treatment fluids") may be used in various capacities during the drilling, completion, and/or production of an oil and gas well (referred to herein as "subterranean operations"). Examples of such treatment fluids may include, for example, drilling fluids, completion fluids, stimulation fluids, and the like.

Drilling fluids may be liquid and/or gaseous fluids used to drill a wellbore into a subterranean formation. Drilling fluids may be circulated through a drill bit within the wellbore as the wellbore is being drilled. The drilling fluids are circulated back to the surface with drilling cuttings for removal from the wellbore. The drilling fluids may be designed to maintain a specific, balanced hydrostatic pressure within the wellbore, permitting all or most of the drilling fluid to be circulated back to the surface.

Completion fluids may be used to facilitate final operations prior to initiation of production of the wellbore after it is drilled, such as by setting screen production liners, packers, downhole valves or shooting perforations into the producing zone. The completion fluids are generally designed to control a well in the event of downhole hardware failure, without damaging the formation or completion components. Completion fluids are typically selected to be chemically compatible with the formation and formation fluids.

Stimulation operations may be used to improve oil and/or gas recovery and well producibility after drilling and completion operations have been completed in a subterranean formation. Stimulation fluids may be used in such operations including, for example, fracturing, acidizing, or other chemical treatments to improve connectivity to the wellbore. Stimulation fluids may be used to carry particulates (e.g., proppant particulates) or other chemicals to a downhole location to facilitate production of the formation.

Each of these treatment fluids, as well as other such treatment fluids used during oil and gas operations, may be used as a carrier fluid and must possess sufficient viscosity to suspend and transport solids (e.g., particulates), such as drill cuttings, formation fines, and proppant particulates, for example. Moreover, the viscosity of a treatment fluid may contribute to the stability of a wellbore by increasing the pressure exerted by the treatment fluid onto the surface of the subterranean formation so as to prevent undesirable inflow of reservoir fluids into the wellbore. Failure of a treatment fluid to maintain desirable viscosity for a particular operation may result in, inter alia, fluid loss of the treatment fluids. As used herein, the term "fluid loss" refers to loss of the fluid phase of a treatment fluid into a subterranean formation. As used herein, the term "fluid" refers to both liquid and gaseous phases. Such fluid loss may result in the inability of the treatment fluid to perform its desired function (e.g., particulate suspension, maintenance of hydrostatic pressure, delivery of desired chemicals to treatment zones, and the like), and may also result in undesirable buildup of solid materials (i.e., a filter cake) on the formation, which may impact recovery of desirable fluids, such as hydrocarbons, from the formation.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering various fluids of the embodiments described herein to a downhole location.

DETAILED DESCRIPTION

The present disclosure generally relates to subterranean formation operations, and more particularly to compositions and methods for performing subterranean formation operations using crosslinked polymers. The crosslinked polymer compositions and methods of use described herein may be used to impart viscosity and fluid loss control to various treatment fluids used during subterranean formation operations. Moreover, the treatment fluids comprising the crosslinked polymers described herein may be used at high temperatures without the need to include clay therein to impart desired viscosity or fluid loss control, for example, although such clay may be added without departing from the scope of the present disclosure.

As used herein, the term "subterranean formation operation" (or "subterranean operation," or "formation operation") refers to any operation for changing a condition of a portion of a wellbore or a subterranean formation adjacent to a wellbore, and does not necessarily imply any particular operation type or purpose. The term "treatment fluid" refers to any fluid used in performing a subterranean formation operation, and does not necessarily imply any particular type or action by the treatment fluid. As used herein, the term "fluid loss control" refers to the act or means of decreasing the volume of a fluid portion of a treatment fluid passing into a subterranean formation.

Although in some instances, the methods utilizing the crosslinked polymer compositions described herein may be with reference to a particular subterranean formation operation, it will be appreciated that any subterranean formation operation utilizing a treatment fluid benefiting from viscosification and/or fluid loss control may include the crosslinked polymers described herein. Examples of such subterranean formation operations may include, but are not limited to, a drilling operation, a completion operation, a cementing operation, a stimulation operation, an acidizing operation, an acid-fracturing operation, a sand control operation, a fracturing operation, a frac-packing operation, a gravel-packing operation, a remedial operation, an enhanced oil recovery operation, and any combination thereof.

Moreover, the crosslinked polymers described herein may be used in any non-subterranean formation operation that may benefit from viscosification and/or fluid loss control properties. Such operations may be performed in any industry including, but not limited to, oil and gas, mining, chemical, pulp and paper, aerospace, medical, automotive, cosmetics, and the like.

Unless otherwise indicated, all numbers expressing quantities of ingredients, properties such as molecular weight, reaction conditions, and so forth used in the present specification and associated claims are to be understood as being modified in all instances by the term "about." As used herein, the term "about" may encompass +/−5% of a numerical value. Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

In some embodiments, the present disclosure provides a crosslinked polymer comprising a first repeating unit of a sulfonic acid-containing monomer, a second repeating unit of an N-vinyl amide and/or a terminal double bond-containing monomer, and a crosslinker comprising at least two olefinic bonds. As used herein, the term "polymer" (or "polymeric material") includes homopolymers, copolymers, terpolymers, tetrapolymers, etc. Additionally, the term "copolymer" is not limited to the combination of polymers having two monomeric units, but includes any combination of monomeric units (e.g., terpolymers, tetrapolymers, etc.). As used herein, the term "crosslinked" (or "crosslink") refers to any bond (e.g., covalent bond, ionic bond, and the like) linking one monomer or polymer chain to another polymer chain. The term "repeating unit" refers to a unit which repeats itself along a polymeric chain.

Each of the components of the crosslinked polymer described herein may be weighted based on the combined weight of the reactants. As used herein, the term "reactants" refers to the monomers and crosslinkers included in a reaction to make a polymer (e.g., the crosslinked polymer) before the reaction occurs. That is, the term "by weight of the reactants" means the combined weight of monomers (i.e., the sulfonic acid-containing monomer, the N-vinyl amide-containing monomer, and the terminal double bond-containing monomer) and crosslinker(s) used to form the crosslinked polymer herein, before such monomers and crosslinker(s) react.

In some embodiments, the crosslinked polymer may have the first repeating unit of the sulfonic acid-containing monomer in an amount ranging from a lower limit of about 50%, 52%, 54%, 56%, 58%, 60%, 62%, 64%, 66%, 68%, 70%, 72%, 74%, and 76% to an upper limit of about 99%, 98%, 96%, 94%, 92%, 90%, 88%, 86%, 84%, 82%, 80%, 78%, and 76% by weight of the reactants, encompassing any value and subset therebetween. For example, in some embodiments, the crosslinked polymer may have the first repeating unit of the sulfonic acid-containing monomer in an amount by weight of the reactants of from about 55% to about 99%, or 60% to about 99%, or 65% to about 99%, or about 70% to about 99%, or about 75% to about 99%, or about 80% to about 99%, or about 85% to about 99%, or about 90% to about 99%, or about 95% to about 99%, encompassing any value and subset therebetween.

The sulfonic acid-containing monomer for use in forming the crosslinked polymers of the present disclosure may be any monomer comprising sulfonic acid. The term "sulfonic acid-containing monomer" refers to organosulfur compounds comprising the general formula $RS(=O)_2—OH$, where R is an organic group containing at least one olefinic group. In some embodiments, the sulfonic-acid containing monomer may be one or more of an acrylic sulfonic acid, a methylallyl sulfonic acid, an allyl sulfonic acid, a styrene sulfonic acid, a vinyl sulfonic acid, a vinyl aromatic sulfonic acid, any salt thereof (e.g., an acrylic sulfonate, a methylallyl sulfonate, an allyl sulfonate, a styrene sulfonate, a vinyl sulfonate, and a vinyl aromatic sulfonate), and any combination thereof. Examples of suitable sulfonic acid-containing monomers for use in the crosslinked polymers of the present disclosure may include, but are not limited to, 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof. In some embodiments, the sulfonic acid-containing monomer may be one or more of a styrene sulfonate, a vinyl sulfonate, 2-acrylamido-2-methylpropane sulfonic acid, a salt of 2-acrylamido-2-methylpropane sulfonic acid, 3-allyloxy-2-hydroxy-1-propanesulfonic acid, and/or a salt of 3-allyloxy-2-hydroxy-1-propanesulfonic acid.

In some embodiments, the crosslinked polymer may have the second repeating unit in an amount ranging from a lower limit of about 1%, 2%, 4%, 6%, 8%, 10%, 12%, 14%, 16%, 18%, 20%, 22%, 24%, and 26% to an upper limit of about 50%, 48%, 46%, 44%, 42%, 40%, 38%, 36%, 34%, 32%, 30%, 28%, and 26% by weight of the reactants, encompassing any value and subset therebetween. For example, in some embodiments, the crosslinked polymer may have the second repeating unit in an amount by weight of the reactants of from about 5% to about 50%, or 10% to about 50%, or 15% to about 50%, or about 20% to about 50%, or about 25% to about 50%, or about 30% to about 50%, or about 35% to about 50%, or about 40% to about 50%, or about 45% to about 50%, encompassing any value and subset therebetween.

In some embodiments, the second repeating unit may be an N-vinyl amide-containing monomer. As used herein, the term "N-vinyl amide-containing monomer" refers to an amide in which at least one vinyl group is attached to at least one nitrogen. In some embodiments, such N-vinyl amide-containing monomers may be either a combination of an acrylic and/or cyclic construct, and may be present in the crosslinked polymer described herein in any arrangement including, but not limited to, alternating, block, branched, linear, periodic, and/or random arrangements. Suitable cyclic N-vinyl amide-containing monomers may have between about 4 and about 15 total carbon atoms. In some embodiments, the N-vinyl amide-containing monomer may include, but is not limited to, a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Suitable specific examples of N-vinyl amide-containing monomers for use in forming the crosslinked polymers described herein may include, but are not limited to, N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3, 4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof. In some embodiments, the N-vinyl amide-containing monomer may be one or more of N-vinyl-2-pyrrolidone, N-vinyl-piperidone, N-vinyl-2-caprolactam, N-vinylformamide, N-vinylacetamide, and/or N-vinyl-N-methylacetamide.

In some embodiments, the second repeating unit may be a terminal double bond-containing monomer in lieu of or in addition to the N-vinyl amide-containing monomer, and present in the same amount as described herein (of from about 1% to about 50% by weight of the reactants). Suitable examples of such terminal double bond-containing monomers may include, but are not limited to, acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Accordingly, in some embodiments, the first repeating unit may be in the range of between about 50% and about 99% and the second repeating unit may be in the range of between about 1% and about 50%, encompassing any value and subset therebetween. In other embodiments, the first repeating unit may be in the range of between about 60% to about 99% and the second repeating unit in the range of between about 1% to about 40%, or the first repeating unit may be in the range of between about 65% to about 99% and the second repeating unit in the range of between about 1% to about 35%, or the first repeating unit may be in the range of between about 70% to about 99% and the second repeating unit in the range of between about 1% to about 30%, or the first repeating unit may be in the range of between about 75% to about 99% and the second repeating unit in the range of between about 1% to about 25%, or the first repeating unit may be in the range of between about 80% to about 99% and the second repeating unit in the range of between about 1% to about 20%, or the first repeating unit may be in the range of between about 85% to about 99% and the second repeating unit in the range of between about 1% to about 15%, or the first repeating unit may be in the range of between about 90% to about 99% and the second repeating unit in the range of between about 1% to about 10%, encompassing any value and subset therebetween.

The amount of the first repeating unit and the second repeating unit may depend on a number of factors including, but not limited to, the type of first and second repeating unit(s) selected, the desired viscosity and/or fluid loss effect when included in a treatment fluid, the type of crosslinker(s) selected, and the like.

A crosslinker may be included in the crosslinked polymers described in the embodiments herein. In some embodiments, the crosslinker may be present in an amount in the range of a lower limit of about 0.01%, 0.1%, 0.5%, 1%, 2%, 3%, 4%, 5%, 6%, 7%, 8%, 9%, 10%, 11%, 12%, and 13%, to an upper limit of about 25%, 24%, 23%, 22%, 21%, 20%, 19%, 18%, 17%, 16%, 15%, 14%, and 13% by weight of the reactants, encompassing any value and subset therebetween. In some embodiments, the crosslinker by weight of the reactants may be between about 1% and about 25%, or about 2% and about 25%, or about 3% and about 25%, or about 4% and about 25%, or about 5% and about 25%, or about 6% and about 25%, or about 7% and about 25%, or about 8% and about 25%, or about 9% and about 25%, or about 10% and about 25%, or about 11% and about 25%, or about 12% and about 25%, or about 13% and about 25%, or about 14% and about 25%, or about 15% and about 25%, or about 16% and about 25%, or about 17% and about 25%, or about 18% and about 25%, or about 19% and about 25%, or about 20% and about 25%, or about 21% and about 25%, or about 22% and about 25%, or about 23% and about 25%, or about 24% and about 25%, encompassing any value and subset therebetween. In some embodiments, the crosslinker may be present in an amount of greater than about 9%, up to about 25% by weight of the reactants, encompassing any value and subset therebetween.

In some embodiments, the crosslinker may be any crosslinker having two olefinic bonds. Conjugated olefinic bonds may also be suitable (e.g., dienes). For example, the crosslinker may be a crosslinker having at least two vinyl groups; at least two allyl groups; at least two acrylate groups; at least two methacrylate groups; at least two acrylamide groups; at least two methacrylamide groups; and/or at least two groups from at least two of a vinyl group, an allyl group, an acrylate group, a methacrylate group, an acrylamide group, and a methacrylamide group. Any combination of these groups may also be used in forming the crosslinked polymer of the present disclosure. Examples of suitable crosslinkers having at least two vinyl groups may include, but are not limited to, divinyl ether; a divinyl ester; a divinyl ether of a polyglycol; a divinyl ether of a polyol; a vinyl ether of a polyol; ethylene glycol divinyl ether; triethylene glycol divinyl ether; poly (ethylene glycol) divinyl ether; 1,3-divinyl-2-imidazolidinone; divinylbenzene; ethylidene pyrrolidone; ethylidene bis(N-vinylpyrrolidone); and any combination thereof. Examples of suitable crosslinkers having at least two allyl groups may include, but are not limited to, diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Examples of suitable crosslinkers having at least two acrylate groups may include, but are not limited to, ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof. Examples of suitable crosslinkers having at least two methacrylate groups may include, but are not limited to, ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof. Examples of suitable crosslinkers having at least two acylamide groups may include, but are not limited to, N,N'-substituted bisacrylamide; N,N'-methylenebis(acrylamide); and any combination thereof. Examples of suitable crosslinkers having at least two methacrylamide groups may include, but are not limited to, N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Examples of suitable crosslinkers having at least two groups from at least two of a vinyl group, an allyl group, an acrylate group, a methacrylate group, an acrylamide group, and a methacrylamide group may include, but are not limited to, an allyl acrylate (i.e., having an allyl group and an acrylate group); N,N-diallylacrylamide (i.e., having two allyl group and an acrylamide group); N-vinyl-3(E)-ethylidene pyrrolidone (i.e., having a vinyl group and an acrylamide group); and any combination thereof.

In some embodiments, the crosslinked polymers of the present disclosure may include a first crosslinker and a second crosslinker in a combined amount as the crosslinkers discussed above (i.e., from about 0.01% to about 25% by weight of the reactants, or from about 9% to about 25% by weight of the reactants, encompassing any value and subset therebetween. In some embodiments, the first crosslinker may be a crosslinker with at least two allyl groups. The second crosslinker may be a crosslinker with at least two vinyl groups; a crosslinker with at least two acrylate groups; a crosslinker with at least two methacrylate groups; a crosslinker with at least two acrylamide groups; a crosslinker with at least two methacrylamide groups; and/or a crosslinker with at least two groups from at least two of a vinyl group, an allyl group, an acrylate group, a methacrylate group, an acrylamide group, and a methacrylamide group. Specific examples of the first and second crosslinkers include any of those listed above.

In some embodiments, where a first and second crosslinker are selected according to the present disclosure, the first and second crosslinker may be present in a ratio of a lower limit of about 0.1:14.9, 0.5:14:9, 1:14.9, 1.5:14.9, 2:14.9, 2.5:14.9, 3:14.9, 3.5:14.9, 4:14.9, 4.5:14.9, 5:14.9, 5.5:14.9, 6:14.9, 6.5:14.9, 7:14.9, 7.5:14.9, 8:14.9, 8.5:14.9, 9:14.9, 9.5:14.9, 10:14.9, 10.5:14.9, 11:14.9, 11.5:14.9, 12:14.9, 12.5:14.9, 13:14.9, 13.5:14.9, 14:14.9, 14.5:14.9, and 14.9:14.9 to an upper limit of about 14.9:0.1, 14.5:0.1, 14:0.1, 13.5:0.1, 13:0.1, 12.5:0.1, 12:0.1, 11.5:0.1, 11:0.1, 10.5:0.1, 10:0.1, 9.5:0.1, 9:0.1, 8.5:0.1, 8:0.1, 7.5:0.1, 7:0.1, 6.5:0.1, 6:0.1, 5.5:0.1, 5:0.1, 4.5:0.1, 4:0.1, 3.5:0.1, 3:0.1, 2.5:0.1, 2:0.1, 1.5:0.1, 1:0.1, 0.5:0.1, and 0.1:0.1, encompassing any value and subset therebetween.

In some embodiments, the first crosslinker may be pentaerythritol allyl ether and the second crosslinker may be 1,3-divinyl-2-imidazolidonone. In such embodiments, the pentaerythritol allyl ether may be present in a ratio to the 1,3-divinyl-2-imidazolidonone in the range of a lower limit of about 0.5:14.5, 1:14.5, 1.5:14.5, 2:14.5, 2.5:14.5, 3:14.5, 3.5:14.5, 4:14.5, 4.5:14.5, 5:14.5, 5.5:14.5, 6:14.5, 6.5:14.5, 7:14.5, 7.5:14.5, 8:14.5, 8.5:14.5, 9:14.5, 9.5:14.5, 10:14.5, 10.5:14.5, 11:14.5, 11.5:14.5, 12:14.5, 12.5:14.5, 13:14.5, 13.5:14.5, 14:14.5, and 14.5:14.5 to an upper limit of about 14.5:0.5, 14:0.5, 13.5:0.5, 13:0.5, 12.5:0.5, 12:0.5, 11.5:0.5, 11:0.5, 10.5:0.5, 10:0.5, 9.5:0.5, 9:0.5, 8.5:0.5, 8:0.5, 7.5:0.5, 7:0.5, 6.5:0.5, 6:0.5, 5.5:0.5, 5:0.5, 4.5:0.5, 4:0.5, 3.5:0.5, 3:0.5, 2.5:0.5, 2:0.5, 1.5:0.5, 1:0.5, 0.5:0.5, encompassing any value and subset therebetween.

In other embodiments, the first crosslinker may be pentaerythritol allyl ether and the second crosslinker may be N,N'-methylenebis(acrylamide). In such embodiments, the pentaerythritol allyl ether may be present in a ratio to the N,N'-methylenebis(acrylamide) in the range of a lower limit of about 0.2:14.8, 0.5:14.8, 1:14.8, 1.5:14.8, 2:14.8, 2.5:14.8, 3:14.8, 3.5:14.8, 4:14.8, 4.5:14.8, 5:14.8, 5.5:14.8, 6:14.8, 6.5:14.8, 7:14.8, 7.5:14.8, 8:14.8, 8.5:14.8, 9:14.8, 9.5:14.8, 10:14.8, 10.5:14.8, 11:14.8, 11.5:14.8, 12:14.8, 12.5:14.8, 13:14.8, 13.5:14.8, 14:14.8, 14.5:14.8, and 14.8:14.8 to an upper limit of about 14.8:0.2, 14.5:0.2, 14:0.2, 13.5:0.2, 13:0.2, 12.5:0.2, 12:0.2, 11.5:0.2, 11:0.2, 10.5:0.2, 10:0.2, 9.5:0.2, 9:0.2, 8.5:0.2, 8:0.2, 7.5:0.2, 7:0.2, 6.5:0.2, 6:0.2, 5.5:0.2, 5:0.2, 4.5:0.2, 4:0.2, 3.5:0.2, 3:0.2, 2.5:0.2, 2:0.2, 1.5:0.2, 1:0.2, 0.5:0.2, 0.2:0.2, encompassing any value and subset therebetween.

In some embodiments, the present disclosure provides a method of performing subterranean formation operations comprising introducing a treatment fluid into a subterranean formation. The treatment fluid may comprise a base fluid and the crosslinked polymer described herein. Suitable base fluids may include, but are not limited to, oil base fluids, aqueous base fluids, aqueous-miscible base fluids, water-in-oil emulsion base fluids, oil-in-water emulsion base fluids, and any combination thereof.

Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous base fluids may include, but are not limited to, fresh water, saltwater (e.g., water containing one or more salts dissolved therein), brine (e.g., saturated salt water), seawater, and any combination thereof. Suitable aqueous-miscible base fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof.

Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. Conversely, suitable oil-in-water emulsion base fluids may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. It should be noted that for water-in-oil and oil-in-water emulsions, any mixture of the above may be used including the water being and/or comprising an aqueous-miscible fluid.

In some embodiments, the crosslinked polymer of the present disclosure may be present in the treatment fluids described herein in an amount sufficient to provide the desired rheological properties, such as viscosity, and/or the desired fluid loss properties to the treatment fluids. In some embodiments, the crosslinked polymer may be present in the treatment fluid in an amount of from a lower limit of about 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the treatment fluid, encompassing any value and subset therebetween.

In some embodiments, the treatment fluids may further comprise certain additives that affect the rheology or properties of the treatment fluid or are designed to facilitate a certain subterranean formation operation, such as those described herein. For example, some suitable additives may include, but are not limited to, a weighting agent, a rheology modifier, a pH buffer, a defoaming agent, a shale stabilizer, and any combination thereof.

The weighting agent may be used to impart density to a treatment fluid that, during a subterranean formation operation, may be useful in, inter alia, controlling formation pressures, preventing formation caving, facilitating pipe pulling, and the like. Examples of suitable weighting agents for use in the treatment fluids described herein may include, but are not limited to, barium sulfate, hematite, calcium carbonate, manganese tetraoxide, galena, ilmenite, iron oxide, siderite, celestite, dolomite, strontium sulfate, and any combination thereof. A suitable commercially available weighting agent may include, but is not limited to, BARACARB® Products, calcium carbonate weighting agents (e.g., BARACARB® 5, BARACARB® 25, and the like), available from Halliburton Energy Services, Inc. in Houston, Tex. In some embodiments, the weighting agent may be present in the range of from a lower limit of about 0.5%, 10%, 15%, 20%, 25%, 30%, 35%, 40%, and 45% to an upper limit of about 90%, 85%, 80%, 75%, 70%, 65%, 60%, 55%, 50%, and 45% by weight of the treatment fluid, encompassing any value and subset therebetween.

The rheology modifier may affect the rheology of the treatment fluids described herein, such as by influencing the viscosity (e.g., thinning the treatment fluid), acting as a dispersant or deflocculant, and the like. Suitable rheology modifiers may include, but are not limited to, a lignite, a lignosulfonate (e.g., an alkaline earth metal lignosulfonate, an alkali metal lignosulfonate, an ammonium lignosulfonate, and the like), a tannin, an alcohol derivative, a synthetic polymer (e.g., polyvinyl pyrrolidone, a copolymer of acrylamide, an acrylamide derivative, and the like), and any combination thereof. Suitable commercially available rheology modifiers may include, but are not limited to, THERMA-THIN® and BDF-528, both synthetic polymers, available from Halliburton Energy Services, Inc. in Houston, Tex. In some embodiments, the rheology modifier may be present in the range of from a lower limit of about 0.01%, 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the treatment fluid, encompassing any value and subset therebetween.

The pH buffer may be used to control the pH of the treatment fluid, which may in some instances affect the operability of certain other additives and/or the crosslinked polymer itself. Suitable pH buffers include any acid and any base that is suitable for use in a subterranean formation operation and that does not adversely affect the operability of the components in a treatment fluid. Examples of such suitable pH buffers may include, but are not limited to, an oxide (e.g., magnesium oxide, calcium oxide, and the like), a hydroxide (e.g., sodium hydroxide, magnesium hydroxide, calcium hydroxide, potassium hydroxide, lithium hydroxide, and the like), a carbonate (e.g., sodium carbonate, potassium carbonate, sodium bicarbonate, sodium sesquicarbonate, and the like), a phosphate (sodium phosphate, potassium phosphate, sodium hydrogen phosphate, potassium hydrogen phosphate, sodium dihydrogen phosphate, potassium dihydrogen phosphate, and the like), a diacetate (e.g., sodium diacetate, potassium diacetate, ammonium diacetate, and the like), sodium borate, fumaric acid, formic acid, hydroxyfluoboric acid, polyaspartic acid, hydrochloric acid, acetic acid, acetic anhydride, hydrofluoric acid, polysuccinimide, sulfamic acid, and any combination thereof. A suitable commercially available pH buffer may include, but is not limited to, BARABUF®, a magnesium oxide pH buffer, available from Halliburton Energy Services, Inc. in Houston, Tex. In some embodiments, the pH buffer may be present in the range of from a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the treatment fluid, encompassing any value and subset therebetween.

A defoaming agent additive may be included in the treatment fluids comprising the crosslinked polymer(s) described herein. The defoaming agent may be used to reduce the foam of the treatment fluid. Examples of suitable defoaming agents may include, but are not limited to, a straight-chain n-alcohol, a polyether polyol, particulate graphite, particulate aluminum stearate, particulate hydrophobically-modified clay, alkylene glycol, polyalkylene glycol, silicone oil, a silicone oil emulsion, a silicone-glycol compound, a silicone-silica adduct, a silicone-silica adduct emulsion, a hydrocarbon-based mineral oil, an organosiloxane, a metal soap, and any combination thereof. A suitable commercially available defoaming agents may include, but is not limited to, BARA-DEFOAM® HP, a polyether polyol defoaming agent, available from Halliburton Energy Services, Inc. in Houston, Tex. In some embodiments, the defoaming additive may be present in the range of from a lower limit of about 0.001%, 0.01%, 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.4%, 1.3%, 1.2%, 1.1%, and 1% by weight of the treatment fluid, encompassing any value and subset therebetween.

The shale stabilizer may be included in the treatment fluids comprising the crosslinked polymer(s) of the present disclosure to inhibit shale and clay within a subterranean formation (e.g., on a surface of a wellbore) from reacting with the water phase of the treatment fluid, minimizing sticking swelling, and sloughing of such shale and clay, thereby increasing wellbore stability. As used herein, the term "shale stabilizer" encompasses clay stabilizers, as well, unless specifically stated otherwise. Suitable shale stabilizers for use in the treatment fluids described herein may include, but are not limited to, a salt of an alkali metal (e.g., potassium chloride, sodium chloride, and the like), an alkali metal acetate, ammonium chloride, tetramethyl ammonium chloride, and any combination thereof. In some embodiments, the shale stabilizer may be present in the range of from a lower limit of about 0.1%, 0.5%, 1%, 2%, 4%, 6%, 8%, 10%, 12%, 14%, 16%, and 18% to an upper limit of about 40%, 38%, 36%, 34%, 32%, 30%, 28%, 26%, 24%, 22%, 20%, and 18% by weight of the treatment fluid, encompassing any value and subset therebetween.

In other embodiments, additional additives may be included in the treatment fluids, without departing from the scope of the present disclosure. Such additional additives may include, but are not limited to, a salt, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an oxygen scavenger, a hydrogen sulfide scavenger, and any combination thereof.

In various embodiments, systems configured for delivering the treatment fluids comprising the crosslinked polymers (and any additional additives) described herein to a downhole location are described. In various embodiments, the systems may comprise a pump fluidly coupled to a tubular, the tubular containing the treatment fluids described herein. It will be appreciated that while the system described below may be used for delivering treatment fluids described herein, one or more portions of the treatment fluid may be delivered separately into the subterranean formation.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the magnetic proppant particulates or micro-proppant described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A crosslinked polymer comprising: reactants of a first repeating unit, a second repeating unit, and a crosslinker that react to form the crosslinked polymer, wherein the first repeating unit is a sulfonic acid-containing monomer present from 50% to 99% by weight of the reactants, wherein the second repeating unit is selected from the group consisting of an N-vinyl amide-containing monomer, a terminal double bond-containing monomer, and any combination thereof, and is present from 1% to 50% by weight of the reactants, and wherein the crosslinker comprises at least two olefinic bonds, and is present in the range of about 9% to about 25% by weight of the reactants.

Embodiment A may have one or more of the following additional elements in any combination:

Element A1: Wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

Element A2: Wherein the sulfonic acid-containing monomer is selected from the group consisting of 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

Element A3: Wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Element A4: Wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

Element A5: Wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Element A6: Wherein the crosslinker is selected from the group consisting of a crosslinker with at least two vinyl groups; a crosslinker with at least two allyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

Element A7: Wherein the crosslinker is a crosslinker with at least two vinyl groups is selected from the group consisting of divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof.

Element A8: Wherein the crosslinker is a crosslinker with at least two allyl groups is selected from the group consisting of diallyl ether; an allyl ether of a diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Element A9: Wherein the crosslinker is a crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Element A10: Wherein the crosslinker is a crosslinker with at least two methacrylate groups is selected from the group consisting of ethylene glycol dimethacrylate; poly (ethylene glycol) dimethacrylate; 1,1,1-trimethylolpropane trimethacrylate; pentaerythritol trimethacrylate; pentaerythritol tetramethacrylate; and any combination thereof.

Element A11: Wherein the crosslinker is a crosslinker with at least two acrylamide groups is selected from the group consisting of N,N'-substituted bisacrylamide; N,N'-methylenebis(acrylamide); and any combination thereof.

Element A12: Wherein the crosslinker is a crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Element A13: Wherein the crosslinker is a crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof.

Element A14: Wherein the sulfonic acid-containing monomer is 2-acrylamido-2-methylpropane sulfonic acid and the N-vinyl amide-containing monomer is N-vinyl-2-pyrrolidone.

By way of non-limiting example, exemplary combinations applicable to Embodiment A include: A with A1, A4, A6, and A14; A with A7, A8, and A10; A with A2, A3, and A9; A with A3, A5, 11, and A13; A1, A6, and A14; A1, A4, A6, A10, A11, and A14.

Embodiment B

A crosslinked polymer comprising: reactants of a first repeating unit, a second repeating unit, and a crosslinker that react to form the crosslinked polymer, wherein the first repeating unit is a sulfonic acid-containing monomer present from 75% to 99% by weight of the reactants, wherein the second repeating unit is selected from the group consisting of an N-vinyl amide-containing monomer, a terminal double bond-containing monomer, and any combination thereof, and is present from 1% to 25% by weight of the reactants, and wherein the crosslinker comprises at least two olefinic bonds, and is present in the range of about 9% to about 25% by weight of the reactants.

Embodiment B may have one or more of the following additional elements in any combination:

Element B1: Wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

Element B2: Wherein the sulfonic acid-containing monomer is selected from the group consisting of 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

Element B3: Wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Element B4: Wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

Element B5: Wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Element B6: Wherein the crosslinker is selected from the group consisting of a crosslinker with at least two vinyl groups; a crosslinker with at least two allyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

Element B7: Wherein the crosslinker is a crosslinker with at least two vinyl groups is selected from the group consisting of divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof.

Element B8: Wherein the crosslinker is a crosslinker with at least two allyl groups is selected from the group consisting of diallyl ether; an allyl ether of a diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Element B9: Wherein the crosslinker is a crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Element B10: Wherein the crosslinker is a crosslinker with at least two methacrylate groups is selected from the group consisting of ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Element B11: Wherein the crosslinker is a crosslinker with at least two acrylamide groups is selected from the group consisting of N,N'-substituted bisacrylamide; N,N'-methylenebis(acrylamide); and any combination thereof.

Element B12: Wherein the crosslinker is a crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Element B13: Wherein the crosslinker is a crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof.

Element B14: Wherein the sulfonic acid-containing monomer is 2-acrylamido-2-methylpropane sulfonic acid and the N-vinyl amide-containing monomer is N-vinyl-2-pyrrolidone.

By way of non-limiting example, exemplary combinations applicable to Embodiment B include: B with B1, B3, B8, and B14; B with B5, B7, B8, and B9; B with B2, B6, and B13; B with B11 and B12; B with B4, B10, B13, and B14; B with B1, B3, and B9.

Embodiment C

A crosslinked polymer comprising: reactants of a first repeating unit, a second repeating unit, a first crosslinker, and a second crosslinker that react to form the crosslinked polymer, wherein the first repeating unit is a sulfonic acid-containing monomer present from 50% to 99% by weight of the reactants, wherein the second repeating unit is selected from the group consisting of an N-vinyl amide-containing monomer, a terminal double bond-containing monomer, and any combination thereof, and is present from 1% to 50% by weight of the reactants, wherein the first crosslinker comprises at least two olefinic bonds, wherein the second crosslinker comprises at least two olefinic bonds, and wherein the first and second crosslinkers combined are present in the range of about 0.01% to about 25% by weight of the reactants.

Embodiment C may have one or more of the following additional elements in any combination:

Element C1: Wherein the first crosslinker is a crosslinker with at least two allyl groups, and the second crosslinker is selected from the group consisting of a crosslinker with at least two vinyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

Element C2: Wherein the first crosslinker is a crosslinker with at least two allyl groups, and the second crosslinker is selected from the group consisting of a crosslinker with at least two vinyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof, and wherein the first crosslinker and the second crosslinker are present in the crosslinked polymer in a ratio in the range of about 0.1:14.9 to about 14.9:0.1.

Element C3: Wherein the first crosslinker is a crosslinker with at least two allyl groups selected from the group consisting of diallyl ether; an allyl ether of a diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Element C4: Wherein the second crosslinker is a crosslinker with at least two vinyl groups selected from the group consisting of divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof.

Element C5: Wherein the second crosslinker is a crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Element C6: Wherein the second crosslinker is a crosslinker with at least two methacrylate groups is selected from the group consisting of ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Element C7: Wherein the second crosslinker is a crosslinker with at least two acrylamide groups is selected from the group consisting of N,N'-substituted bisacrylamide; N,N'-methylenebis(acrylamide); and any combination thereof.

Element C8: Wherein the second crosslinker is a crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Element C9: Wherein the second crosslinker is a crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof.

Element C10: Wherein the first crosslinker is pentaerythritol allyl ether and the second crosslinker is 1,3-divinyl-2-imidazolidinone.

Element C11: wherein the first crosslinker is pentaerythritol allyl ether and the second crosslinker is 1,3-divinyl-2-imidazolidinone, and wherein the pentaerythritol allyl ether and the 1,3-divinyl-2-imidazolidinone are present in the crosslinked polymer in a ratio in the range of about 0.5:14.5 to about 14.5:0.5.

Element C12: Wherein the first crosslinker is pentaerythritol allyl ether and the second crosslinker is N,N'-methylenebis(acrylamide).

Element C13: wherein the first crosslinker is pentaerythritol allyl ether and the second crosslinker is N,N'-methylenebis(acrylamide), and wherein the pentaerythritol allyl ether and the N,N'-methylenebis(acrylamide) are present in the crosslinked polymer in a ratio in the range of about 0.2:14.8 to about 14.8:0.2.

Element C14: Wherein the first and second crosslinkers combined are present in the range of about 9% to about 25% by weight of the reactants.

Element C15: Wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

Element C16: Wherein the sulfonic acid-containing monomer is selected from the group consisting of 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

Element C17: Wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Element C18: Wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3, 5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

Element C19: Wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Element C20: Wherein the sulfonic acid-containing monomer is 2-acrylamido-2-methylpropane sulfonic acid and the N-vinyl amide-containing monomer is N-vinyl-2-pyrrolidone.

By way of non-limiting example, exemplary combinations applicable to Embodiment C include: C with C1, C5, C6, and C20; C with C3, C4, C11, C12, and C19; C with C2, C8, C9, C10, and C15; C with C7, C13, and C14; C with C1, C4, C8, C10, and C11.

Embodiment D

A crosslinked polymer comprising: reactants of a first repeating unit, a second repeating unit, a first crosslinker, and a second crosslinker that react to form the crosslinked polymer, wherein the first repeating unit is a sulfonic acid-containing monomer present from 75% to 99% by weight of the reactants, wherein the second repeating unit is selected from the group consisting of an N-vinyl amide-containing monomer, a terminal double bond-containing monomer, and any combination thereof, and is present from 1% to 25% by weight of the reactants, wherein the first crosslinker comprises at least two olefinic bonds, wherein the second crosslinker comprises at least two olefinic bonds, and wherein the first and second crosslinkers combined are present in the range of about 0.01% to about 25% by weight of the reactants.

Embodiment D may have one or more of the following additional elements in any combination:

Element D1: Wherein the first crosslinker is a crosslinker with at least two allyl groups, and the second crosslinker is selected from the group consisting of a crosslinker with at least two vinyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

Element D2: Wherein the first crosslinker is a crosslinker with at least two allyl groups, and the second crosslinker is selected from the group consisting of a crosslinker with at least two vinyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof, and wherein the first crosslinker and the second crosslinker are present in the crosslinked polymer in a ratio in the range of about 0.1:14.9 to about 14.9:0.1.

Element D3: Wherein the first crosslinker is a crosslinker with at least two allyl groups selected from the group consisting of diallyl ether; an allyl ether of a diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Element D4: Wherein the second crosslinker is a crosslinker with at least two vinyl groups selected from the group consisting of divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof.

Element D5: Wherein the second crosslinker is a crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Element D6: Wherein the second crosslinker is a crosslinker with at least two methacrylate groups is selected from the group consisting of ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Element D7: Wherein the second crosslinker is a crosslinker with at least two acrylamide groups is selected from the group consisting of N,N'-substituted bisacrylamide; N,N'-methylenebis(acrylamide); and any combination thereof.

Element D8: Wherein the second crosslinker is a crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Element D9: Wherein the second crosslinker is a crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof.

Element D10: Wherein the first crosslinker is pentaerythritol allyl ether and the second crosslinker is 1,3-divinyl-2-imidazolidinone.

Element D11: wherein the first crosslinker is pentaerythritol allyl ether and the second crosslinker is 1,3-divinyl-2-imidazolidinone, and wherein the pentaerythritol allyl ether and the 1,3-divinyl-2-imidazolidinone are present in the crosslinked polymer in a ratio in the range of about 0.5:14.5 to about 14.5:0.5.

Element D12: Wherein the first crosslinker is pentaerythritol allyl ether and the second crosslinker is N,N'-methylenebis(acrylamide).

Element D13: wherein the first crosslinker is pentaerythritol allyl ether and the second crosslinker is N,N'-methylenebis(acrylamide), and wherein the pentaerythritol allyl ether and the N,N'-methylenebis(acrylamide) are present in the crosslinked polymer in a ratio in the range of about 0.2:14.8 to about 14.8:0.2.

Element D14: Wherein the first and second crosslinkers combined are present in the range of about 9% to about 25% by weight of the reactants.

Element D15: Wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

Element D16: Wherein the sulfonic acid-containing monomer is selected from the group consisting of 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

Element D17: Wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Element D18: Wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

Element D19: Wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Element D20: Wherein the sulfonic acid-containing monomer is 2-acrylamido-2-methylpropane sulfonic acid and the N-vinyl amide-containing monomer is N-vinyl-2-pyrrolidone.

By way of non-limiting example, exemplary combinations applicable to Embodiment D include: D with D1, D5, D6, and D19; D with D3, D7, D8, D10, and D20; D with D13, D14, and D15; D with D2, D4, D9, D11, and D12; D with D1, D18, and D19; D with D3, D5, D7, and D17.

Embodiment E

A method comprising: introducing a treatment fluid into a subterranean formation, wherein the treatment fluid comprises a base fluid and a crosslinked polymer, the crosslinked polymer comprising: reactants of a first repeating unit, a second repeating unit, and a crosslinker that react to form the crosslinked polymer, wherein the first repeating unit is a sulfonic acid-containing monomer present from 50% to 99% by weight of the reactants, wherein the second repeating unit selected from the group consisting of an N-vinyl amide-containing monomer, a terminal double bond-containing monomer, and any combination thereof, and is present from 1% to 50% by weight of the reactants, and wherein the crosslinker comprises at least two olefinic bonds.

Embodiment E may have one or more of the following additional elements in any combination:

Element E1: Wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

Element E2: Wherein the sulfonic acid-containing monomer is selected from the group consisting of 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

Element E3: Wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Element E4: Wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-di methyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

Element E5: Wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Element E6: Wherein the crosslinker is selected from the group consisting of a crosslinker with at least two vinyl groups; a crosslinker with at least two allyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

Element E7: Wherein the crosslinker is a crosslinker with at least two vinyl groups is selected from the group consisting of divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof.

Element E8: Wherein the crosslinker is a crosslinker with at least two allyl groups is selected from the group consisting of diallyl ether; an allyl ether of a diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Element E9: Wherein the crosslinker is a crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Element E10: Wherein the crosslinker is a crosslinker with at least two methacrylate groups is selected from the group consisting of ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Element E11: Wherein the crosslinker is a crosslinker with at least two acrylamide groups is selected from the group consisting of N,N'-substituted bisacrylamide; N,N'-methylenebis(acrylamide); and any combination thereof.

Element E12: Wherein the crosslinker is a crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Element E13: Wherein the crosslinker is a crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof.

Element E14: Wherein the sulfonic acid-containing monomer is 2-acrylamido-2-methylpropane sulfonic acid and the N-vinyl amide-containing monomer is N-vinyl-2-pyrrolidone.

Element E15: Wherein the crosslinker is present in the range of about 0.01% to about 25% by weight of the reactants.

Element E16: Wherein the crosslinker is present in the range of about 9% to about 15% by weight of the reactants.

Element E17: Wherein the first repeating unit is present from about 75% to 99%, and the second repeating unit is present from 1% to 25% by weight of the reactants.

By way of non-limiting example, exemplary combinations applicable to Embodiment E include: E with E1, E3, E4, and E15; E with E2, E16, and E17; E with E7, E9, and E11; E with E10, E11, E12, and E14; E with E5, E6, E8, and E13; E2, E8, and E10.

Embodiment F

A system comprising: a tubular extending into a wellbore in a subterranean formation; and a pump fluidly coupled to the tubular, the tubular containing a treatment fluid comprising a base fluid and a crosslinked polymer, wherein the crosslinked polymer comprises: reactants of a first repeating unit, a second repeating unit, and a crosslinker that react to form the crosslinked polymer, wherein the first repeating unit is a sulfonic acid-containing monomer present from 50% to 99% by weight of the reactants, wherein the second repeating unit is selected from the group consisting of an N-vinyl amide-containing monomer, a terminal double bond-containing monomer, and any combination thereof, wherein the second repeating unit is present from 1% to 50% by weight of the reactants, and wherein the crosslinker comprises at least two olefinic bonds.

Embodiment F may have one or more of the following additional elements in any combination:

Element F1: Wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

Element F2: Wherein the sulfonic acid-containing monomer is selected from the group consisting of 2-acrylamido-2-methylpropane sulfonic acid, 2-methacrylamido-2-methylpropanesulfonic acid, α-methyl styrenesulfonic acid, 2-sulfoethyl methacrylate, vinylbenzene sulfonic acid, 3-allyloxy-2-hydroxy-1-propanesulfonic acid, any salt thereof, any ester thereof, and any combination thereof.

Element F3: Wherein the N-vinyl amide-containing monomer is selected from the group consisting of a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

Element F4: Wherein the N-vinyl amide-containing monomer is selected from the group consisting of N-vinyl-2-pyrrolidone; N-vinyl-2-caprolactam; N-vinyl-piperidone; N-vinyl-3-methyl pyrrolidone; N-vinyl-4-methylpyrrolidone; N-vinyl-5-methylpyrrolidone; N-vinyl-3-ethyl pyrrolidone; N-vinyl-3-butyl pyrrolidone; N-vinyl-3,3-dimethylpyrrolidone; N-vinyl-4, 5-dimethylpyrrolidone; N-vinyl-5,5-dimethylpyrrolidone; N-vinyl-3,3,5-trimethylpyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; N-vinylformamide; N-vinylacetamide; N-vinylpropanamide; N-vinyl-N-methylacetamide; and any combination thereof.

Element F5: Wherein the terminal double bond-containing monomer is selected from the group consisting of acrylamide, N-substituted acrylamides, methacrylamide, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinylimidazole, allylimidazole, diallyldimethylammonium halide, any salt thereof, and any combination thereof.

Element F6: Wherein the crosslinker is selected from the group consisting of a crosslinker with at least two vinyl groups; a crosslinker with at least two allyl groups; a crosslinker with at least two acrylate groups; a crosslinker with at least two methacrylate groups; a crosslinker with at least two acrylamide groups; a crosslinker with at least two methacrylamide groups; a crosslinker with at least two groups from at least two of a vinyl group, an allyl group, an acrylate group, a methacrylate group, an acrylamide group, and a methacrylamide group; and any combination thereof.

Element F7: Wherein the crosslinker is a crosslinker with at least two vinyl groups is selected from the group consisting of divinyl ether; a divinyl ester; a divinyl ether of a polyglycol; a divinyl ether of a polyol; a vinyl ether of a polyol; ethylene glycol divinyl ether; triethylene glycol divinyl ether; poly(ethylene glycol) divinyl ether; 1,3-divinyl-2-imidazolidinone; divinylbenzene; ethylidene pyrrolidone; ethylidene bis(N-vinylpyrrolidone); and any combination thereof.

Element F8: Wherein the crosslinker is a crosslinker with at least two allyl groups is selected from the group consisting of diallyl ether; an allyl ether of a diallyl ether; a diallyl ester; an allyl ether of a polyglycol; an allyl ether of a polyol; an allyl amine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine; and any combination thereof.

Element F9: Wherein the crosslinker is a crosslinker with at least two acrylate groups is selected from the group consisting of ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Element F10: Wherein the crosslinker is a crosslinker with at least two methacrylate groups is selected from the group consisting of ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Element F11: Wherein the crosslinker is a crosslinker with at least two acrylamide groups is selected from the group consisting of N,N'-substituted bisacrylamide; N,N'-methylenebis(acrylamide); and any combination thereof.

Element F12: Wherein the crosslinker is a crosslinker with at least two methacrylamide groups is selected from the group consisting of N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof.

Element F13: Wherein the crosslinker is a crosslinker with at least two groups from at least two of a vinyl group, an allyl group, an acrylate group, a methacrylate group, an acrylamide group, and a methacrylamide group is selected from the group consisting of an allyl acrylate; N,N-diallylacrylamide; N-vinyl-3(E)-ethylidene pyrrolidone; and any combination thereof.

Element F14: Wherein the sulfonic acid-containing monomer is 2-acrylamido-2-methylpropane sulfonic acid and the N-vinyl amide-containing monomer is N-vinyl-2-pyrrolidone.

Element F15: Wherein the crosslinker is present in the range of about 0.01% to about 25% by weight of the reactants.

Element F16: Wherein the crosslinker is present in the range of about 9% to about 15% by weight of the reactants.

Element F17: Wherein the first repeating unit is present from about 75% to 99%, and the second repeating unit is present from 1% to 25% by weight of the reactants.

By way of non-limiting example, exemplary combinations applicable to Embodiment F include: F with F1, F2, F4, and F8; F with F3, F10, F12, and F17; F with F11, F13, F14, and F16; F with F4, F7, F9, and F12; F with F5, F6, F15, and F17.

To facilitate a better understanding of the embodiments of the present disclosure, the following examples of preferred or representative embodiments are given. In no way should the following examples be read to limit, or to define, the scope of the disclosure.

Example 1

In this example, two crosslinked polymers were prepared according to the embodiments of the present disclosure to evaluate the effect of the amount of crosslinker included therein. A first crosslinked polymer (CP1) was prepared comprising 81% by weight of the reactants of the sulfonic acid-containing monomer 2-acrylamido-2-methylpropane sulfonic acid (AMPS), 14% by weight of the reactants of the N-vinyl amide-containing monomer N-vinyl-2-pyrrolidone (NVP), and 5% by weight of the reactants of the crosslinker pentaerythritol allyl ether (PAE). A second crosslinked polymer (CP2) was prepared comprising 73.4% by weight of the reactants of the sulfonic acid-containing monomer AMPS, 12.9% by weight of the reactants of the N-vinyl amide-containing monomer NVP, and 13.7% by weight of the reactants of the crosslinker PAE. Two identical treatment fluids were prepared using a fresh water base fluid, either CP1 or CP2, and additional additives, according to Table 1 below.

TABLE 1

| Treatment Fluid Formulation | Amount |
| --- | --- |
| Fresh Water (base fluid component) | 0.13 cubic meters (m³) (0.79 barrels (bbl)) |
| Potassium Chloride (shale stabilizer component) | 3.63 kg (8 pounds (lb)) |
| CP1 or CP2 (crosslinked polymer) | 3.18 kilograms (kg) (7 lb) |
| Barite (weighting agent additive) | 141.07 kg (311 lb) |
| BDF-528 (rheology modifier additive) | 0.45 kg (1 lb) |
| THERMA-THIN ® (rheology modifier additive) | 1.36 kg (3 lb) |
| Sodium Bicarbonate (pH buffer additive) | 1.81 kg (4 lb) |
| Sodium Hydroxide (pH buffer additive) | 0.18 kg (0.4 lb) |

Each treatment fluid was either (1) aged by hot rolling at 66.6° C. (150° F.) for 16 hours (66.6° C./16 hr), or (2) aged by hot rolling at 66.6° C./16 hr, followed by static aging at 204.4° C. (400° F.) for 36 hours (204.4° C./36 hr). Rheology data was obtained using a FANN® 35 A Viscometer at 48.9° C. (120° F.) by measuring the shear stress of the bob at different shear rates between 3 revolutions per minute (rpm) to 600 rpm (units: lb/100 ft²), and determining the plastic viscosity (PV) (units: centipoise (cP)) and the yield point (YP) (units: lb/100 ft²). The 10 second (s) gel and 10 minute (min) gel were measured by allowing the sample to remain static for 10 s or 10 min, respectively, and, then, measuring the maximum deflection at 3 rpm with the FANN® 35 A Viscometer (units: lb/100 ft²). The rheology results are reported in Table 2 below.

TABLE 2

| Rheology Data | Treatment Fluid with CP1 | | Treatment Fluid with CP2 | |
| --- | --- | --- | --- | --- |
| | 66.6° C./ 16 hr | 66.6° C./ 16 hr + 204.4° C./ 36 hr | 66.6° C./ 16 hr | 66.6° C./ 16 hr + 204.4° C./ 36 hr |
| 600 rpm | 136 | 84 | 94 | 87 |
| 300 rpm | 88 | 48 | 59 | 51 |
| 200 rpm | 69 | 36 | 47 | 39 |
| 100 rpm | 46 | 22 | 31 | 25 |
| 6 rpm | 11 | 5 | 8 | 6 |
| 3 rpm | 9 | 3 | 6 | 5 |
| 10 s gel | 9 | 4 | 8 | 6 |
| 10 min gel | 11 | 4 | 11 | 7 |
| PV | 48 | 36 | 35 | 36 |
| YP | 40 | 12 | 24 | 15 |

As shown in Table 2, the CP2 crosslinked polymers having greater crosslinker appear to have better thermal stability as compared to the lesser amount of crosslinker in CP1, although both produce desirable results. The initial viscosity at 600 rpm for CP1 is high for both aging schemes, but drops considerably at the higher temperature and longer aging time, resulting in a drop in the yield point of 28; whereas the same drop in yield point with CP2 was only 9. A further indication of the increased thermal stability of CP2 compared to CP1 is the change in the 6 rpm and 3 rpm readings, where CP1 dropped by more than 50% and CP2 only dropped by about 20%.

Example 2

In this example, two crosslinked polymers were prepared according to the embodiments of the present disclosure to evaluate the effect of using two crosslinkers compared to only one. A first crosslinked polymer (CP3) was prepared comprising 76% by weight of the reactants of the sulfonic acid-containing monomer AMPS, 19% by weight of the reactants of the N-vinyl amide-containing monomer NVP, and 5% by weight of the reactants of the crosslinker PAE. A second crosslinked polymer (CP4) was prepared comprising 76% by weight of the reactants of the sulfonic acid-containing monomer AMPS, 19% by weight of the reactants of the N-vinyl amide-containing monomer NVP, 4% by weight of the reactants of the crosslinker PAE, and 1% by weight of the reactants of the crosslinker 1,3-divinyl-2-imidazolidinone (DVI). Two identical treatment fluids were prepared using a fresh water base fluid, either CP1 or CP2, and additional additives, according to Table 3 below.

TABLE 3

| Treatment Fluid Formulation | Amount |
| --- | --- |
| Fresh Water (base fluid component) | 0.13 m³ (0.79 bbl) |
| Potassium Chloride (shale stabilizer component) | 3.63 kg (8 lb) |
| CP3 or CP4 (crosslinked polymer) | 3.18 kg (7 lb) |
| Barite (weighting agent additive) | 141.07 kg (311 lb) |
| BDF-528 (rheology modifier additive) | 0.45 kg (1 lb) |
| THERMA-THIN ® (rheology modifier additive) | 1.36 kg (3 lb) |
| Sodium Bicarbonate (pH buffer additive) | 1.81 kg (4 lb) |
| Sodium Hydroxide (pH buffer additive) | 0.18 kg (0.4 lb) |

Rheology data was obtained for each treatment fluid using a FANN® 35 A Viscometer at 48.9° C. (120° F.) as detailed in Example 1 above both before static aging (BSA) and after static aging (ASA) at 232.2° C. (450° F.) for 16 hours. The rheology results are reported in Table 4 below.

TABLE 4

| Rheology Data | Treatment Fluid with CP3 | | Treatment Fluid with CP4 | |
| --- | --- | --- | --- | --- |
| | BSA | ASA | BSA | ASA |
| 600 rpm | 121 | 74 | 116 | 98 |
| 300 rpm | 79 | 42 | 74 | 63 |
| 200 rpm | 65 | 36 | 61 | 49 |
| 100 rpm | 43 | 23 | 40 | 33 |
| 6 rpm | 11 | 4 | 12 | 10 |

TABLE 4-continued

| Rheology Data | Treatment Fluid with CP3 | | Treatment Fluid with CP4 | |
|---|---|---|---|---|
| | BSA | ASA | BSA | ASA |
| 3 rpm | 9 | 3 | 10 | 8 |
| 10 s gel | 10 | 4 | 12 | 11 |
| 10 min gel | 13 | 6 | 18 | 14 |
| PV | 42 | 32 | 42 | 35 |
| YP | 37 | 10 | 32 | 28 |

As shown in Table 4, the CP4 crosslinked polymers having two crosslinkers appear to have better thermal stability as compared to the single of crosslinker in CP3 based on their higher viscosities, particularly at low shear rates and particularly after static aging. As an indication of the increased thermal stability of CP4 compared to CP3 is the change in the 6 rpm and 3 rpm readings, where CP3 dropped by about 30% and CP4 maintained about 80% of the original value. Further, the yield point after aging dropped by 27 for CP3 and only by 4 for CP4.

Example 3

In this example, crosslinked polymers were prepared according to the embodiments of the present disclosure to evaluate the ability of the crosslinked polymers to impart viscosity and fluid loss control to treatment fluids having a fresh water base fluid and a seawater base fluid when two crosslinkers are used. The crosslinked polymer (CP5) was prepared comprising 76% by weight of the reactants of the sulfonic acid-containing monomer AMPS, 19% by weight of the reactants of the N-vinyl amide-containing monomer NVP, 4% by weight of the reactants of the crosslinker PAE, and 1% by weight of the reactants of the crosslinker DVI. Two identical treatment fluids were prepared using a fresh water base fluid or a seawater base fluid, according to Table 5 below.

TABLE 5

| Formulation | Fresh Water Treatment Fluid | Seawater Treatment Fluid |
|---|---|---|
| Fresh Water | 0.13 m³ | — |
| (base fluid component) | (0.79 bbl) | |
| Potassium Chloride | 3.63 kg | — |
| (shale stabilizer | (8 lb) | |
| component) | | |
| Seawater | — | 0.13 m³ |
| (base fluid component) | | (0.79 bbl) |
| CP5 | 3.18 kg | 3.18 kg |
| (crosslinked polymer) | (7 lb) | (7 lb) |
| Barite | 141.07 kg | 141.07 kg |
| (weighting agent additive) | (311 lb) | (311 lb) |
| BDF-528 | 0.36 kg | 0.23 kg |
| (rheology modifier additive) | (0.8 lb) | (0.5 lb) |
| THERMA-THIN ® | 1.36 kg | 1.36 kg |
| (rheology modifier additive) | (3 lb) | (3 lb) |
| Sodium Bicarbonate | 1.81 kg | 1.81 kg |
| (pH buffer additive) | (4 lb) | (4 lb) |
| Sodium Hydroxide | 0.23 kg | 0.23 kg |
| (pH buffer additive) | (0.5 lb) | (0.5 lb) |
| BARA-DEFOAM ® HP | 0.1 milliliters (ml) | 0.1 ml |
| (defoaming agent additive) | | |

Rheology data was obtained for each treatment fluid using a FANN® 35 A Viscometer at 48.9° C. (120° F.) as detailed in Example 1 above and the high pressure, high temperature (HPHT) filtration control (i.e., fluid loss) (units: ml) of the treatment fluids was tested on a FANN® Model 4700 HPHT filter press with an API standard filter paper (6.35 centimeter (cm) (i.e., 2.5 inch) diameter) with glass fiber backing. Fluid was collected in a graduated cylinder at 176.7° C. (350° F.) and 500 psi differential pressure for 30 minutes. The volume of fluid collected was multiplied by 2 to give the fluid loss value. The treatment fluids were evaluated either (1) before static aging, (2) after dynamic aging at 65.6° C. (150° F.) for 16 hours (65.6° C./16 hr), or (3) after dynamic aging at 65.6° C./16 hr followed by various amounts of additional high temperature static aging at either 204.4° C. (400° F.) for an additional 16 hours, hours, 48 hours, and/or 72 hours (204.4° C./16 hr, 204.4°/36 hr, 204.4° C./48 hr, and 204.4° C./72 hr, respectively), 218.3° C. (425° F.) for an additional 16 hours (218.3° C./16 hr), 232.2° C. (450° F.) for an additional 16 hours (232.2° C./16 hr), or 246.1° C. (475° F.) for an additional 16 hours (246.1° C./16 hr). The results are shown in Table 6 below for the fresh water treatment fluid and in table 7 below for the seawater treatment fluid.

TABLE 6

| Fresh Water Treatment Fluid Comprising CP5 | | | | | | | | | | |
|---|---|---|---|---|---|---|---|---|---|---|
| Dynamic Aging | — | 65.6/16 hr | 65.6/16 hr | 65.6/16 hr | 65.6/16 hr | — | 65.6/16 hr | 65.6/16 hr | 65.6/16 hr | 65.6/16 hr |
| Static Aging | — | — | 204.4/36 hr | 204.4/48 hr | 204.4/72 hr | — | — | 218.3/16 hr | 232.2/16 hr | 246.1/16 hr |

| Rheology Data | | | | | | | | | | |
|---|---|---|---|---|---|---|---|---|---|---|
| 600 rpm | 93 | 78 | 69 | 62 | 61 | 97 | 86 | 69 | 69 | 120 |
| 300 rpm | 58 | 49 | 42 | 38 | 38 | 62 | 54 | 41 | 43 | 94 |
| 200 rpm | 45 | 38 | 32 | 29 | 29 | 49 | 42 | 31 | 33 | 82 |
| 100 rpm | 30 | 25 | 20 | 18 | 19 | 33 | 28 | 20 | 21 | 65 |
| 6 rpm | 8 | 7 | 5 | 4 | 5 | 9 | 7 | 4 | 6 | 32 |
| 3 rpm | 7 | 5 | 3 | 3 | 4 | 8 | 6 | 3 | 5 | 29 |
| 10 s gel | 8 | 6 | 4 | 4 | 5 | 8 | 6 | 4 | 5 | 29 |
| 10 min gel | 13 | 7 | 4 | 4 | 6 | 14 | 8 | 5 | 6 | 32 |
| PV | 35 | 29 | 27 | 27 | 23 | 35 | 32 | 28 | 26 | 26 |
| YP | 23 | 20 | 15 | 14 | 15 | 27 | 22 | 13 | 17 | 68 |
| HPHT filtrate | — | 17.6 | 20.0 | 21.2 | 24.0 | — | 14.2 | 25.6 | 22.8 | 40.0 |

TABLE 7

Seawater Treatment Fluid Comprising CP5 Dynamic Aging

| | — | 65.6/16 hr | 65.6/16 hr | 65.6/16 hr | 65.6/16 hr |
|---|---|---|---|---|---|
| Static Aging | | | | | |
| | — | — | 204.4/16 hr | 204.4/48 hr | 204.4/72 hr |
| Rheology Data | | | | | |
| 600 rpm | 114 | 102 | 86 | 86 | 97 |
| 300 rpm | 75 | 66 | 54 | 55 | 61 |
| 200 rpm | 59 | 52 | 41 | 43 | 48 |
| 100 rpm | 40 | 34 | 27 | 28 | 31 |
| 6 rpm | 11 | 10 | 6 | 7 | 8 |
| 3 rpm | 9 | 8 | 5 | 6 | 6 |
| 10 s gel | 10 | 8 | 6 | 6 | 7 |
| 10 min gel | 14 | 10 | 7 | 10 | 11 |
| PV | 39 | 36 | 32 | 31 | 36 |
| YP | 36 | 30 | 22 | 24 | 25 |
| HPHT filtrate | — | 16.0 | 16.0 | 16.8 | 16.4 |

As shown, CP5 in both the fresh water treatment fluid and the seawater treatment fluid show temperature stabilities up to or greater than 204.4° C., where the CP5 continues to act as a viscosifier. CP5 also behaves as an effective fluid loss control agent, having an HPHT filtrate volume of 16.0, 16.8, and 16.4, where desirable HPHT filtrate volumes to demonstrate effective fluid loss control are less than about 20 ml, or less than about 30 ml at elevated temperatures greater than about 204.4° C. (400° F.).

Example 4

In this example, a crosslinked polymer was prepared according to the embodiments of the present disclosure to evaluate the effect of using two crosslinkers. A crosslinked polymer (CP6) was prepared comprising 78.5% by weight of the reactants of the sulfonic acid-containing monomer AMPS, 13.9% by weight of the reactants of the N-vinyl amide-containing monomer NVP, 7% by weight of the reactants of the crosslinker PAE, and 0.6% by weight of the reactants of the crosslinker N,N'-methylenebis(acrylamide). A treatment fluid was prepared using a fresh water base fluid, CP6, and additional additives, according to Table 8 below.

TABLE 8

| Treatment Fluid Formulation | Amount |
|---|---|
| Fresh Water (base fluid component) | 0.13 m³ (0.83 bbl) |
| Potassium Chloride (shale stabilizer component) | 3.63 kg (8 lb) |
| CP6 (crosslinked polymer) | 2.95 kg (6.5 lb) |
| Barite (weighting agent additive) | 87.03 kg (191.86 lb) |
| BDF-528 (rheology modifier additive) | 0.36 kg (0.8 lb) |
| THERMA-THIN ® (rheology modifier additive) | 1.36 kg (3 lb) |
| Sodium Bicarbonate (pH buffer additive) | 1.81 kg (4 lb) |
| Sodium Hydroxide (pH buffer additive) | 0.18 kg (0.4 lb) |

Each treatment fluid was either (1) aged by hot rolling at 66.6° C. (150° F.) for 16 hours (66.6° C./16 hr), or (2) aged by hot rolling at 66.6° C./16 hr, followed by static aging at 204.4° C. (400° F.) for 36 hours (204.4° C./36 hr). Rheology data was obtained using a FANN® 35 A Viscometer at 48.9° C. (120° F.) as detailed in Example 1 above and the HPHT filtration control (i.e., fluid loss) was obtained as detained in Example 3 above. The rheology results are reported in Table 9 below.

TABLE 9

| Rheology Data | Treatment Fluid with CP6 | |
|---|---|---|
| | 66.6° C./16 hr | 66.6° C./16 hr + 204.4° C./36 hr |
| 600 rpm | 65 | 78 |
| 300 rpm | 43 | 51 |
| 200 rpm | 32 | 39 |
| 100 rpm | 21 | 26 |
| 6 rpm | 6 | 8 |
| 3 rpm | 5 | 6 |
| 10 s gel | 7 | 7 |
| 10 min gel | 11 | 9 |
| PV | 22 | 27 |
| YP | 21 | 24 |
| HPHT Filtrate | — | 16.6 |

As shown in Table 9, the CP6 treatment fluid exhibits good thermal stability. The PV and YP changed very little and the change in the 6 rpm and 3 rpm readings were minimal. Further, the HPHT filtrate of 16.6 ml indicates effective fluid loss control.

Therefore, the present disclosure is well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A crosslinked polymer comprising:
    reactants of a first repeating unit, a second repeating unit, a first crosslinker, and a second crosslinker that react to form the crosslinked polymer, wherein the first repeating unit is a sulfonic acid-containing monomer present from 50% to 99% by weight of the reactants, wherein the second repeating unit is selected from the group consisting of an N-vinyl amide-containing monomer, a terminal double bond-containing monomer, and any combination thereof, and is present from 1% to 50% by weight of the reactants, wherein the first crosslinker comprises at least two allyl groups, wherein the second crosslinker comprises at least two vinyl groups, wherein the first crosslinker is present in an amount of 0.01% to 20% by weight of the reactants and the second crosslinker is present in an amount of 0.01% to 10% by weight of the reactants, and wherein the first crosslinker is pentaerythritol allyl ether and the second crosslinker is 1,3-divinyl-2-imidazolidinone.

2. The crosslinked polymer of claim 1, wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

3. The crosslinked polymer of claim 1, wherein the N-vinyl amide-containing monomer is a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

4. The crosslinked polymer of claim 1, wherein the sulfonic acid-containing monomer is 2-acrylamido-2-methylpropane sulfonic acid and the N-vinyl amide-containing monomer is N-vinyl-2-pyrrolidone.

5. A crosslinked polymer comprising:
reactants of a first repeating unit, a second repeating unit, a first crosslinker, and a second crosslinker that react to form the crosslinked polymer,
wherein the first repeating unit is a sulfonic acid-containing monomer present from 75% to 99% by weight of the reactants, wherein the second repeating unit is selected from the group consisting of an N-vinyl amide-containing monomer, a terminal double bond-containing monomer, and any combination thereof, and is present from 1% to 25% by weight of the reactants, wherein the first crosslinker is present in an amount of 0.01% to 20% by weight of the reactants, wherein the second crosslinker is present in an amount of 0.01%, to 10% by weight of the reactants, and wherein the first crosslinker is pentaerythritol allyl ether and the second crosslinker is N,N'-methylenebis(acrylamide).

6. A crosslinked polymer comprising:
reactants of a first repeating unit, a second repeating unit, a first crosslinker, and a second crosslinker that react to form the crosslinked polymer,
wherein the first repeating unit is a sulfonic acid-containing monomer present from 50% to 99% by weight of the reactants, wherein the second repeating unit is selected from the group consisting of an N-vinyl amide-containing monomer, a terminal double bond-containing monomer, and any combination thereof, and is present from 1% to 50% by weight of the reactants, wherein the first crosslinker is present in an amount of 0.01% to 20% by weight of the reactants and the second crosslinker is present in an amount of 0.01% to 10% by weight of the reactants, and wherein the first crosslinker is pentaerythritol allyl ether and the second crosslinker is N,N'-methylenebis(acrylamide).

7. The crosslinked polymer of claim 6, wherein the sulfonic acid-containing monomer is selected from the group consisting of an acrylic sulfonic acid, a methylallyl sulfonic acid, an allyl sulfonic acid, a styrene sulfonic acid, a vinyl sulfonic acid, a vinyl aromatic sulfonic acid, any salt thereof, and any combination thereof.

8. The crosslinked polymer of claim 6, wherein the N-vinyl amide-containing monomer is a pyrrolidone-containing N-vinyl amide, a piperidone-containing N-vinyl amide, a caprolactam-containing N-vinyl amide, an acrylate-containing N-vinyl amide, an alkene-containing N-vinyl amide, an alkyl-containing N-vinyl amide, and any combination thereof.

9. The crosslinked polymer of claim 6, wherein the sulfonic acid-containing monomer is 2-acrylamido-2-methylpropane sulfonic acid and the N-vinyl amide-containing monomer is N-vinyl-2-pyrrolidone.

10. The crosslinked polymer of claim 1, wherein the wherein the first crosslinker is present in an amount of 5% to 20% by weight of the reactants and the second crosslinker is present in an amount of 0.01% to 5% by weight of the reactants.

11. The crosslinked polymer of claim 1, wherein the wherein the first crosslinker is present in an amount of 8% to 20% by weight of the reactants and the second crosslinker is present in an amount of 0.01% to 2% by weight of the reactants.

12. The crosslinked polymer of claim 1, wherein the wherein the first crosslinker is present in an amount of 8% to 15% by weight of the reactants and the second crosslinker is present in an amount of 0.01% to 3% by weight of the reactants.

13. The crosslinked polymer of claim 5, wherein the wherein the first crosslinker is present in an amount of 5% to 20% by weight of the reactants and the second crosslinker is present in an amount of 0.01% to 5% by weight of the reactants.

14. The crosslinked polymer of claim 5, wherein the wherein the first crosslinker is present in an amount of 8% to 200/% by weight of the reactants and the second crosslinker is present in an amount of 0.01% to 2% by weight of the reactants.

15. The crosslinked polymer of claim 5, wherein the wherein the first crosslinker is present in an amount of 8% to 15% by weight of the reactants and the second crosslinker is present in an amount of 0.01% to 3% by weight of the reactants.

* * * * *